(12) United States Patent
Goldschmidt (10) Patent No.: US 6,983,266 B1
(45) Date of Patent: Jan. 3, 2006

(54) COMPLIANCE MONITORING FOR ANOMALY DETECTION

(75) Inventor: Peter Solly Goldschmidt, Sorrento (AU)

(73) Assignee: Alert-KM PTY LTD, West Perth (AU)

( * ) Notice: Subject to any disclaimer, the term of this patent is extended or adjusted under 35 U.S.C. 154(b) by 0 days.

(21) Appl. No.: 09/958,513

(22) PCT Filed: Apr. 7, 2000

(86) PCT No.: PCT/AU00/00295

§ 371 (c)(1),
(2), (4) Date: Dec. 5, 2001

(87) PCT Pub. No.: WO00/62210

PCT Pub. Date: Oct. 19, 2000

(30) Foreign Application Priority Data

Apr. 7, 1999  (AU) .......................... PP9615

(51) Int. Cl.
*G06F 9/44*   (2006.01)
*G06F 17/00*  (2006.01)

(52) U.S. Cl. .......................................... 706/52; 706/46
(58) Field of Classification Search ............... 706/52, 706/46
See application file for complete search history.

(56) References Cited

U.S. PATENT DOCUMENTS 5,577,169 A   11/1996  Prezioso ...................... 706/52
5,724,488 A   3/1998   Prezioso ...................... 706/52
6,292,830 B1 * 9/2001  Taylor et al. ................. 709/224
6,694,482 B1 * 2/2004  Arellano et al. ........... 715/500.1

OTHER PUBLICATIONS

Taylor et al, Concurrent Automatic Test Pattern Generation, IEEE Colloquium on Algorithm and Knowledge Based CAD and VLSI, Nov. 1989.*

* cited by examiner

*Primary Examiner*—George Davis
(74) *Attorney, Agent, or Firm*—Merchant & Gould P.C.

(57) ABSTRACT

A method and system for supporting a compliance agent in compliance monitoring for anomaly detection (CMAD) involves a primary monitoring system comparing some predetermined conditions of acceptance with the actual data or event. If any variance is detected (an anomaly) by the primary monitoring system, an exception report or alert is produced, identifying the variance. In a simple environment, this identification of the variance fulfils the evidence conditions and determines an instance of non-compliance. However, in a more complex environment, it may only be an indicator of a suspect non-compliant event (SNCE). In the latter case, the compliance agent uses the results of the initial monitoring as well as important information related to the event and requiring judgmental expertise to obtain further evidence of non-compliance. Compliance gents develop propositions or believes, based on their assumption. For each proposition node in the system, the assumption based truth maintenance system maintains a list of minimum sets of assumptions (Boolean cues), which are relevant to the SNCE type. At the macro level, the construct uses the trivalent belief-disbelief-unknown. However, this is refined by applying a measure of importance to individual pieces or empirical evidence.

18 Claims, 6 Drawing Sheets

Media and Cancellations

Is the price move explained by a recent media report? ..................... [ YES ]

How important is this in explaining the price move?

| ☐ Not Important | ☐ Slightly Important | ☒ Important | ☐ Very Important | ☐ Extremely Important |

Did today's price movement occur on volumes relatively low for this stock?.... [ NO ]

Was the alert generated because the trade was cancelled?....................... [ YES ]

Give details are brokers involved: [                    ]

Buying and Selling Pressure Bids Compared to Asks

Is a particular broker responsible for all or most of today's price move?......... [ YES ]

Is this broker noted in notes and/or history?................................. [ YES ]

How important is this in explaining the price move?

| ☐ Not Important | ☐ Slightly Important | ☐ Important | ☒ Very Important | ☐ Extremely Important |

Has a particular broker got layers of bids/asks?............................ [ NO ]

[ Cancel ]   [ Done ]   [ More >> ]

Linguistic variables associated with a positive Boolean response

Boolean response

*Fig. 6*

COMPLIANCE MONITORING FOR ANOMALY DETECTION

FIELD OF TH INVENTION

The present invention relates to compliance monitoring for anomaly detection (CMAD) in a complex environment and relates particularly, though not exclusively, to CMAD in a capital market environment using multi-agent technology to support a review process of a team of compliance analysts.

BACKGROUND TO THE INVENTION

The process of categorising an event by its deviation from some predetermined pattern or theory is termed anomaly detection. The process of compliance monitoring for anomaly detection (CMAD) involves a primary monitoring system comparing some predetermined conditions of acceptance with the actual data or event. These primary monitoring systems typically use templates, cases, threshold levels (filters) or checklists, separately or in combination. If any variance is detected by the primary monitoring system, an exception report or alert is produced, identifying the variance. In a simple environment this identification of the variance fulfils the conditions of necessary and sufficient evidence and thus determines an instance of non-compliance. In a more complex environment it may be only an indicator of possible non-compliance. In the latter case further evidence will be required to substantiate the hypothesis of non-compliance. The function of a CMAD system is therefore two-fold, namely identifying a variance, and producing and accumulating (if required) supporting evidence.

In a complex environment, CMAD decision making is ex post, more involved and may require multiple steps. The event monitoring and decision making is in a domain where the initial monitoring uses a priori thresholds broader than in a simple environment, i.e., more granular. This initial monitoring produces exceptions that identify suspected non-compliant events (SNCEs). Once these exceptions have been produced, it is then the task of the decision maker to substantiate true positive exceptions. True positives are those exceptions that the decision maker has determined are indeed anomalous and where the evidence supports this assertion. To obtain this supporting evidence the decision maker uses the results of the initial monitoring as well as important information, related to the event, and characterised by its interpretive nature, requiring judgmental expertise. The decision maker may also need to identify, categorise and discard any false positive exceptions. These are exceptions that have signalled suspected events that require further scrutiny, and are subsequently rejected by the decision maker, for various reasons. On the other hand, false negatives are events for which the current monitoring facilities do not generate an exception, and allow possible suspect events to slip through the CMAD sieve. If the initial monitoring threshold limits are stringent enough, it can be argued that the marginal false negatives could be subsumed and later considered. Nevertheless, this would not necessarily reduce the occurrence of true false negatives as their characteristics may not be known.

CMAD has been employed in the data intensive capital market, in which products are traded through different types of orders by market participants, who follow market rules and comply with regulatory structures. Market participants evaluate products and analyse news to determine when to place orders. Regulatory bodies monitor news and market activity to determine when participants are not in compliance with market rules. Conduct which is in breach of market rules and exchange regulations include instances of insider trading and various forms of market manipulation. An example of a prior art CMAD system in the capital market ($CMAD_{cm}$) is the current surveillance operation at the Australian Stock Exchange (ASX), which uses an analytical model based on the statistical matching approach to $CMAD_{cm}$. It combines computer-based decision support systems to analyse market events with communication software, text retrieval and graphics. The system, surveillance of market activity (SOMA), includes related sub-systems such as real-time monitoring of market events, news display, market replay, and alerts history. SOMA originated from the New York Stock Exchange's (NYSE) STOCK WATCH system and was modified for the Australian context. SOMA primarily uses statistical methods (means, variances, moving averages, days since last traded, etc.) to identify SNCEs.

Problems that are found with the prior art analytical compliance monitoring models include the following:

Difficulties arise because in general, (1) details of the SNCE source agent may not be known and must be discovered or inferred from the data; (2) the definition of 'unusual pattern of behaviou' is subjective and possibly changes with every analysis and over time; and (3) the quantity of the data in an analysis is overwhelming. Other problems encountered with analytical models include (4) incomplete model theories—models often contain incomplete theories as well as incomplete data; (5) incomplete model inputs—even the best models occasionally produce decisions much worse than a human analyst would, because they do not include some important factors; (6) incomplete model outputs the analys's risk preference in dealing with uncertain outcomes might differ from that of the model. Conversely, the analysts role is trivialised if the model makes all the decisions; and, (7) incomplete explanations—models provide precision at the expense of intuition and common sense.

These analytical, predictive and compliance models are often rejected by the decision-makers. Consequently, to compensate for these limitations, some analysts "tune" the results by making heuristic adjustments to the analytical model. This tuning produces a model forecast that is consistent with intuitive expectations, and maintains the detail and structure of the analytical model. However, tuned forecasts can easily be misused. Alternatively, a cognitive model of an analyst, implemented as an expert system, might perform better at predictive tasks than an analytical model. However, probability based cognitive models fail in domains where there is too much reliance on judgment. In these domains, judgments are dynamic and their representation is difficult to quantify and verify.

SUMMARY OF THE INVENTION

The present invention was developed with a view to providing a method and system of supporting a compliance agent in CMAD in a complex environment, which enables the agent to perform the task of decision making with greater accuracy and efficiency. The agent may be human or machine based.

Although the following description will be provided with particular reference to $CMAD_{cm}$, it is be understood that the method and system of the invention is not limited in its application to the capital market environment. The method and system of supporting a compliance agent in CMAD in accordance with the invention may find many other applications in fields as diverse as commerce, industry, medicine and defense. Other applications include electronic commerce decision-making; data warehouse monitoring; enterprise resource management (ERM) compliance monitoring (continuous auditing decision support), fraud detection monitoring, and privacy compliance monitoring; monitoring industrial, medical and defense safeguards; information filtering, retrieval, transfer and exchange; and, applications requiring the systematic reduction of "noise" associated with any surveillance, information acquisition or evaluation tasks; and, applications which assist in monitoring compliance of organisational strategic, managerial and operational imperatives.

Throughout this specification the term "comprising" is used inclusively, in the sense that there may be other features and/or steps included in the invention not expressly defined or comprehended in the features or steps subsequently defined or described. What such other features and/or steps may include will be apparent from the specification read as a whole.

According to one aspect of the present invention there is provided a method of supporting a compliance agent in compliance monitoring for anomaly detection (CMAD), the method including the steps of:

receiving information relating to a suspected non-compliant event (SNCE) generated by a primary monitoring system;

selecting first heuristic cues corresponding to a set of premises from a knowledge base, said set of premises being grouped together as of possible relevance to the SNCE;

obtaining a response from the agent to each of the first heuristic cues in the form of Boolean responses;

selecting second heuristic cues from said knowledge base based on said Boolean responses;

obtaining responses from the agent to each of the second heuristic cues in the form of linguistic variables;

combining said linguistic variables with respective relevance measures for each of said second heuristic cues to produce respective weighted intermediate propositions, said intermediate propositions providing supporting evidence; and, combining said weighted intermediate propositions to produce final propositions repudiating or confirming the SNCE, which together with said supporting evidence enables the agent to make a decision regarding the SNCE more efficiently.

Preferably said responses to each of the second heuristic cues are in the form of fuzzy linguistic variables.

Preferably the method is capable of supporting multiple compliance agents, said multiple agents together forming a team in which the agents are organised sequentially and hierarchically, with each successive agent having greater domain knowledge and experience.

Typically said method further comprises providing each compliance agent with access to a common central database via a graphic user interface (GUI) for human agents, or an appropriate communication protocol for machine based agents.

According to another aspect of the present invention there is provided a system for supporting a compliance agent in compliance monitoring for anomaly detection, the system comprising:

a relational database for receiving and storing information relating to a suspected non-compliant event (SNCE) generated by a primary monitoring system;

a knowledge and search processing system accessible to the compliance agent for receiving and storing information relating to a suspected non-compliant event (SNCE) generated by a primary monitoring system, and for selecting first heuristic cues corresponding to a set of premises from a knowledge base, said set of premises being grouped together as of possible relevance to the SNCE;

a graphic user interface (GUI) for human agents, or appropriate communication protocol for machine based agents, to enable the agent to respond to each of the first heuristic cues using Boolean responses; and wherein, said knowledge and search processing system is also adapted to select second heuristic cues from said knowledge base based on said Boolean responses, and said GUI for human agents, or appropriate communication protocol for machine based agents, is adapted to enable the agent to respond to each of the second heuristic cues using linguistic variables, and wherein, said knowledge and search processing system is adapted to combine said fuzzy linguistic variables with respective relevance measures for each of said second heuristic cues to produce respective weighted intermediate propositions, said intermediate propositions providing supporting evidence, and to combine said weighted intermediate propositions to produce final propositions repudiating or confirming the SNCE, which together with said supporting evidence enables the agent to make a decision regarding the SNCE more efficiently.

Advantageously said system further comprises a "blackboard" in the form of a dynamic reference database to facilitate communication and review of the compliance agents' decision making process, in a multi-agent CMAD decision support system.

BRIEF DESCRIPTION OF THE DRAWINGS

In order to facilitate a more comprehensive understanding of the nature of the invention a preferred embodiment of the method and system for supporting compliance monitoring for anomaly detection (CMAD) will now be described in detail, by way of example only, with reference to the accompanying drawings, in which.

DETAILED DESCRIPTION OF THE INVENTION

Figure 1:
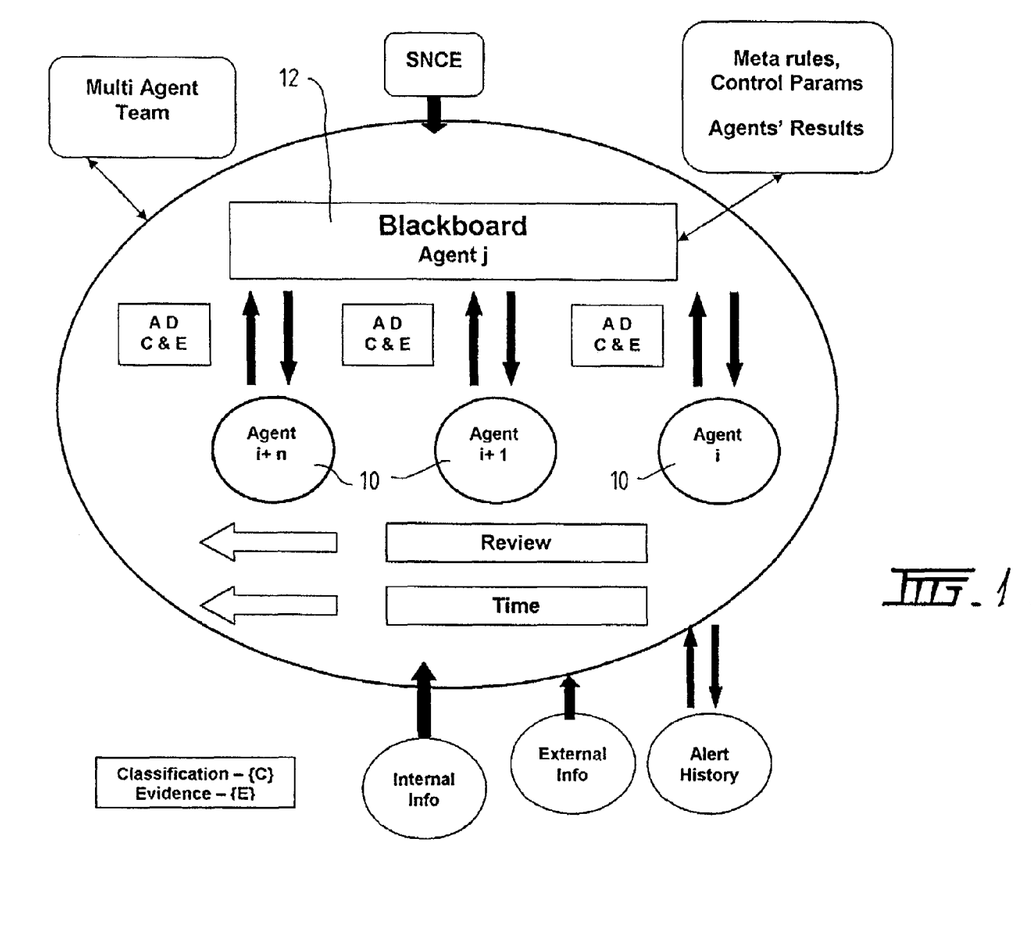
FIG. 1 illustrates a conceptual model of a preferred embodiment of the $CMAD_{cm}$ multi-agent decision support system.

The CMAD system and method in accordance with the invention may be employed to support a single agent in the compliance decision making process. However, in a complex environment such as the data intensive capital market, the CMAD system and method would more typically be used to support a team of agents working on a single task over time. Each human agent has individual support that is coordinated for overall team support. This coordination is manifest as the team memory and multi-agent technology is used to facilitate both the individual and team support. FIG. 1 illustrates a conceptual model for a preferred embodiment of an intelligent decision support system (IDSS) using multi-agent technology (MAT) to support a $CMAD_{cm}$ team review process.

In a $CMAD_{cm}$ environment, the problem solving process is typically collaborative, as the agents share the available data, processed or not, and they are organised sequentially, and hierarchically, with each successive agent having greater domain knowledge and experience. Each agent ($CMAD_{cm}A$) in the team completes their task, but their results may subsequently be modified or explained away by a more senior agent who may apply a different interpretation to the various aspects of evidence supporting or repudiating the hypothesis of non-compliance. The $CMAD_{cm}$ team decision support system as illustrated in FIG. 1 comprises a series of nodes $10_i$ with the individual $CMAD_{cm}A$'s components at each node. Functionally, the CMAD Team Decision Support System (DSS), TDSS, supports individual team members and provides coordination. The overall CMAD problem to be solved is decomposed into sub-problems assigned to the agents, each agent, asynchronously, plans its own action and turn in its solution to be coordinated with the solution of other agents. The agents use either task or data sharing to cooperate with other agents.

Each node $10_i$ is connected to a central cache or blackboard 12, which acts as a team memory repository and also contains control rules. Each team member has his or her own IDSS, database and graphic user interface (GUI), access to the blackboard, access to other databases containing historical information and access to relevant external information sources such as, for example, real-time market information, news services, brokers news letters and the like. In the case of machine-based agents, appropriate communication protocols are employed for communicating with the central cache or blackboard. The knowledge appropriate to the novice is included at the first node $10_i$ and incremental knowledge appropriate to the more experienced team members is included in their nodes $10_{i+1} \ldots 10_{i+n}$. The knowledge in the system supports the decision making. This domain knowledge, at its lowest level, refers to the $CMAD_{cm}$ objects, events and actions. At a higher level there is knowledge about the domain knowledge: this is meta knowledge, which acts in determining the appropriate domain knowledge to be used in a given situation.

As part of their analysis, compliance agents develop propositions or beliefs, based on their assumptions. These assumptions are by nature default assumptions, which hold that in the absence of evidence to the contrary, the item under review is sound. These propositions may then be communicated to a more experienced compliance agent who may judge them as true, false or unknown. The judgments of the more experienced compliance agent may be subsequently communicated back to the originating agent, who may negotiates until a consensus is reached. For the $CMAD_{cm}$ team construct, each node $10_i$ has a knowledge base made up of rules and facts reflecting the domain knowledge at that node, a premise set, consisting of facts and empirical information reflected by the responses to Boolean cues appropriate to the type of SNCE under consideration, default assumptions made up of the teams default assumptions in the form of relevance measures, and the $CMAD_{cm}A$'s assumptions. Based on these components, intermediate and final propositions (beliefs) are derived.

The components of the domain knowledge include:
1. descriptive knowledge, which relates to the data and information about the $CMAD_{cm}$ problem solving;
2. procedural knowledge, which specifies the steps necessary to achieve the $CMAD_{cm}$ decision task;
3. reasoning knowledge, which specifies what conclusions can be drawn given the presence or absence of evidence supporting the intermediate hypotheses supporting or refuting the NC hypothesis;
4. derived knowledge, which may be derived from other knowledge components of $CMAD_{cm}$ knowledge and may itself actually belong to other components if made permanent;
5. linguistic knowledge, which is concerned with the syntax and semantics of the $CMAD_{cm}$ problem domain;
6. presentation knowledge, which pertains to how the knowledge should be disclosed;
7. assimilative knowledge, which is knowledge about what new knowledge to accept from external sources;
8. evaluative knowledge, which is knowledge about the relevance of the knowledge accepted from external sources;
9. dynamic knowledge, which is knowledge about the relevance and impact that other knowledge classifications have on the $CMAD_{cm}$ problem domain over time;
10. evidential knowledge, which is concerned with the assumptions and propositions that substantiate or repudiate the hypothesis of NC.

The above knowledge components extends the current CMAD state of the art. These knowledge categories can be broadly classified as domain knowledge [d] (comprising items 1–4) and interactive knowledge [I](items 5–10).

The key to problem solving is knowledge. Additional knowledge to coordinate team members includes the task status knowledge [TS], which is concerned with whether a member is still in the process or has finished their assigned task, and the identification knowledge [ID], which identifies the team member. This is classified as coordination knowledge [COR].

The above knowledge is viewed as a triplet, $$K = <d, COR, I>.$$

The team knowledge [T]components include the sum of the components of the domain knowledge plus the interactions between them. The team equals the collection of nodes.

$$T = \{n_1, \ldots, n_m\}$$

The domain knowledge $d_i$ of $n_i$, $i=1, \ldots m$, includes the facts, models and knowledge about the use of the results of the model, heuristics knowledge etc. and $\exists d_{i+1} \rightarrow d_{1.}$ or $d_i \cap d_{i+1} \neq 0$, but is small.

That is, there exists an amount of incremental domain knowledge, $d_{i+1}$, that is different from the novice domain knowledge, $d_i$. The amount of incremental domain knowledge is small. However there may be differences in the interpretation and degree of relevance that can have a significant impact on the results generated.

The domain knowledge of the team is represented by $D_T = \{d_1, \ldots d_m\}$ where $d_i \neq d_{i+j}$, $1 \geq j \leq m$.

The expertise of node $n_i$ is $$E_i = \{e_{i1}, e_{i2}, e_{i3} \ldots e_{iz}\},$$

where $e_{il}$, l=1, . . . , z, represents the various categories of information, and partial or final propositions that $n_i$ can generate as a result of being in the possession of $d_i$.

It is necessary to point out that the $CMAD_{cm}$ team presented is a subset of a collection of teams and individuals whose tasks may impact on the $CMAD_{cm}$ team's operations.

When all the information required to make a decision is present, exact reasoning can be used to produce exact conclusions. However, in the real world, it is rare that all the facts are present, prompting various theories of reasoning under uncertainty to be proposed. They include classical probability, Bayesian probability, Shannon's (1948)[1] theory based on probability, Dempster-Shafer theory (Shafer 1976), and Zadehl's (1965) fuzzy set theory. When exact reasoning is not appropriate, inexact, or approximate, reasoning involving rules, uncertain facts, or both, can be used. The type of representation and reasoning used determines the appropriate method of evidence formulation and combination.

Concurrent with the choice of knowledge representation and reasoning, appropriate evidence metrics and formulations need to be applied. Under conditions of uncertainty three classes of approach have been adopted: probability approaches, approaches based on Demster-Schafer's theory of evidence, and approaches based on fuzzy logic. The Bayesian approach is based on the evaluation of the probability of an hypothesis through an observation of evidence. Due to the difficulties of specifying posterior probabilities or likelihood ratios, a certainty factor approach can be used. However the theory of certainty factors is an ad hoc theory that does not appear to be generally valid for longer inference chains. Dempster-Schafer theory does have a rigorous foundation, however there does not seem to be any clear consensus on its application for general use in ESs. A detailed discussion of the first two approaches applied to decision analysis can be found in Henrion et al. (1991).

Fuzzy theory, (Zadeh 1965), is the most general theory of uncertainty that has been formulated. Fuzzy set theory is a more appropriate technique in decision environments where there may be a high degree of uncertainty and ambiguity, such as $CMAD_{cm}$ and in areas of accounting and auditing where there is uncertainty and ambiguous terms such as important or slightly important are used.

At the highest level of the construct, for each proposition node in the system, the assumption based truth maintenance system maintains a list of minimum sets of assumptions (Boolean cues), which are relevant to the SNCE type, under which the corresponding proposition can be fully or partially proved or explained. At the macro level, the construct uses the trivalent belief-disbelief-unknown, however this is refined by applying a measure of the importance that individual pieces of empirical evidence and acts have on the propositions. Fuzzy linguistic variables are used to capture this measure of importance and prototypical frames to represent this knowledge.

Figure 2:
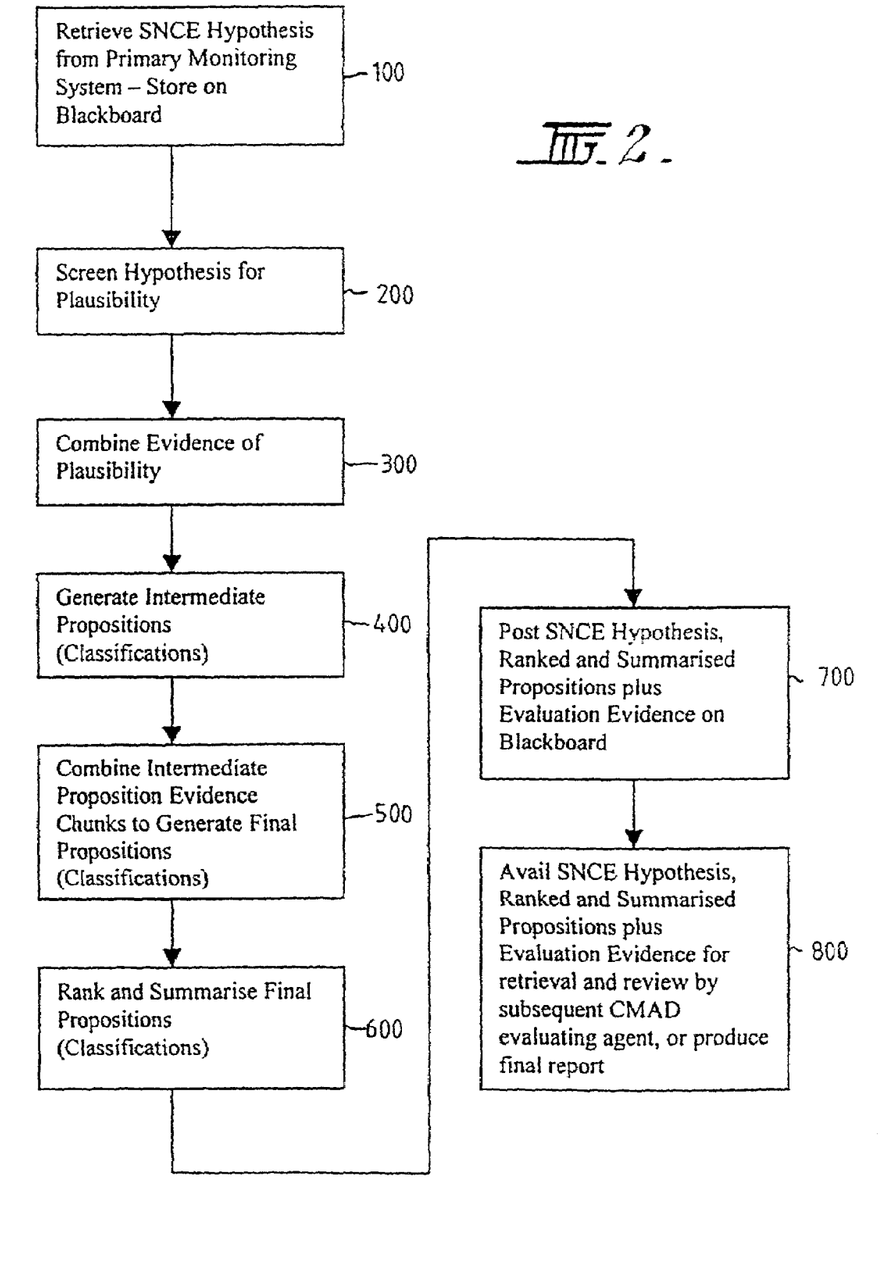
FIG. 2 illustrates a preferred method of supporting a compliance agent in compliance monitoring for anomaly detection (CMAD) in accordance with the invention.

FIG. 2 illustrates in flow chart form a preferred embodiment of the method of supporting a compliance agent in CMAD in accordance with the present invention. In the first step 100, SNCE and associated data and information is retrieved from the primary monitoring computer system. This information is stored on a blackboard (typically a database system is used for the blackboard). The retrieved and stored SNCE hypothesis triggers meta-rules to associate heuristic rules with cues appropriate to the SNCE hypothesis. Then, at step 200 the SNCE hypothesis is screened for plausibility utilising quantitative and qualitative evidence. The qualitative evidence is managed using linguistic variables and fuzzy sets to deal with heuristic judgements. The quantitative evidence may be fuzzified or crisp—as a subset of fuzzy. Standard fuzzy operators are used and fuzzy sets can also be used for statistical applications. The resulting evidence of plausibility is then combined at step 300 and used to generate the intermediate propositions (classifications) at step 400.

At step 500, the resulting intermediate proposition evidence chunks are combined to produce final propositions (final classifications). These final propositions are then ranked and summarised at step 600. At step 700, the final (ranked and summarised) propositions plus evaluation evidence, and the SNCE hypothesis, are posted on the blackboard. Finally, at step 800, ranked and summarised propositions, and evaluation evidence is made available via co-ordination and communication protocols, for retrieval and review by subsequent CMAD evaluating agents, or a final report is produced.

In order to weigh the importance of data or conditions on data, the concept of relevance measures is used. The RM metric associated with each atomic condition in a complex condition lies on the (0,1) interval. An RM of 1 has the maximum relevance and conversely the minimum RM is 0. RMs are elicited from the $CMAD_{cm}A$ as part of the initial knowledge acquisition, and make up part of the default assumptions.

Responses to Boolean cues, i.e., True or False, linguistic variables (LV) are associated with each positive response. The LVs range from extremely important (EI) to not important (NI). These LVs are combined with the RM to produce an adjusted evidence measure for each element concerned, the importance of how relevant an assumption is on a premise (IDR). Elements associated with the same classification goal are then combined to form an evidence chunk. The components of the domain knowledge are used to evaluate the evidence chunks and the global degree of evidence for the hypotheses under consideration, to produce the intermediate and final proposition (belief). The processes used to form each evidence chunk and to evaluate the overall global degree of evidence relating to the hypothesis under consideration are set out below.

To formulate IDR, the influence of relevance measures on evidence evaluation, we use the combination of the relevance measures and the level of importance. This takes the form of a connective, $$^f\text{CONNECTIVE}: D_{EV} \times D_{RM} \to D_{EV}$$

where $D_{EV}$ represents the domain of evidence, i.e. the level of importance, and $D_{RM}$ is the domain of relevance measures. The corrected evidence obtained by applying $^f$CONNECTIVE to the pair<observed_evidence, RM> of a fact is the requirements for the connective function are shown in (1) and (2) for the two cases of AND and OR connectives respectively.

(1) $f_{AND}(e, 0) = 1$
$f_{AND}(e, 1) = e$
$f_{AND}(0, m) = 1 - m$
$f_{AND}(1, m) = 1$
$f_{AND}(e, m) \geq e$ if $0 < e < 1$ and $0 < m < 1$
$f_{AND}(e, m) = m^*e + (1 - m)$ (2) $f_{OR}(e, 0) = 0$
$f_{OR}(e, 1) = e$
$f_{OR}(0, m) = 0$
$f_{OR}(1, m) = m$
$f_{OR}(e, m) \geq$ if $0 < e < 1$ and $0 < m < 1$ The first operand of both $f_{AND}$ and $f_{OR}$ represents the observed evidence of an atomic condition and the second operand the relevance measure of the finding occurring in the atomic condition.

Functions (3), which satisfy (1) and (2), are used to constrain the form of the formulae which define $f_{AND}$ and $f_{OR}$.

$$f_{AND}(e,m) = m*e + (1-m)$$

$$f_{OR}(e,m) = m*e \quad (3)$$

Once the revised evidence degree has been evaluated for the elementary conditions, (4), (5) and (6) are used to combine the elementary evidence to form a chunk of evidence.

$$e(AND(T_1 T_2 \ldots T_n)) = \alpha + \beta*(\beta - \alpha) \text{ where} \quad (4)$$

$$\alpha = \prod_{j=1}^{n} e(T_j) \text{ and } \beta = \min_{j=1}^{n} e(T_j)$$

$$e(NOT\ T) = 1 - e(T) \quad (5)$$

$$e(OR(T_1 T_2 \ldots T_n)) = e(NOT(AND((NOT\ T_1)(NOT\ T_2) \ldots (NOT\ T_n)))) \quad (6)$$

A heuristic approach is used to combine the evidence degrees of the related knowledge chunks to form the global evidence degree of the terminal hypothesis. The staring point is the Bernoulli formula (7).

$$e_1 + e_2 = e_1 + (1-e_1)*e_2 \quad (7)$$

However, as this considers the degrees of evidence as the same with no single value having a privileged position, we proceed from (8) to formulate (9), to distinguish between the primary and secondary findings.

$$e_1 + \lambda e_2 = e_1 = (1-e_1)*e_2*g(e_1,)\lambda \quad (8)$$

where the parameter $\lambda$ represents the degree of privilege. {PARA0}

$g(e_1, 1) = 1$      (perfect privilege)
$g(e_1, 0) = e_1$      (unfair privilege)
$g(e_1, \lambda) = X$ with $e_1 < X < 1$ when $0 < \lambda < 1$ $g(e_1,\lambda) = e_1 + (1-e_1)*\lambda$ (9)

By varying $\lambda$ an evidence combination scheme, which assigns more or less predominance to the evidence, can be used.

An operator for evidence combination is used to account for the intuitive semantics of the exclusion rules. This operator is essentially multiplicative since the global evidence degree of the hypothesis should not decrease in case the evidence gathered by the exclusion rule is null.

Assuming that the additive operator is defined by (7), the fair multiplicative operator has to be defined as:

$$e_1 O_f e_2 = e_1 * e_2$$

and the evidence degree of the hypothesis H is obtained as $$e(H) = ((e(P) + \mu e(S)) O_f [1 - e(ER)])$$

where e(P) represents the degree of the primary evidence, e(S) represents the secondary evidence and [1−e(ER)] represents the evidence degree of the negation of the exclusion rules.

Finally, to take into account the confirmation rules, to evaluate the overall global degree of evidence of the hypothesis under consideration, we use (10) to combine the degrees of evidence of the separate knowledge chunks obtained from e(P), e(S), e(ER) and the confirmation rule e(CR):

$$e(H) = (((e(P) + \mu e(S)) O_f [1 - e(ER)]) + \mu e(CR)).$$

Table 1 illustrates a frame for Substantial Shareholders Notice (SSN), which is a notice filed by a shareholder that holds at least 5% of the company's stock and buys or sells some stock. Each slot in the frame has the following form:

<linguistic_value $V_{ij}$, possibility_value $i_{ij}$> and is associated in each slot with assumption i. Each slot is interpreted as follows. The fact that assumption i takes the (linguistic) value $V_{ij}$ is compatible with the hypothesis H (the intermediate proposition) with possibility $i_{ij}$. The linguistic variable range from extremely important, through very important, important, slightly important, to not important, is associated with an assumption. The resulting degree of importance is then combined with associated relevance measures (RMs) (the $CMAD_{cm}A$ default assumptions) to produce weighted intermediate propositions. These weighted intermediate propositions are then combined to produce final propositions or conclusions, which are then ranked.

TABLE 1

FRAME: Substantial Shareholders Notice (SSN)

Triggers

Today's Price versus Previous Close
    RM = 1.0

Necessary Findings

The level of importance of an SSN being lodged recently to the price move
<V1, 0.75> <1, 0.5> <S1, 0.25> <N1, 0.0>
    RM = 1.0

Secondary Findings

The level of importance of a particular broker being responsible for all or most of today's volume to the price move
<E1, 1.0> <V1, 0.75> <1, 0.5> <S1, 0.25> <N1, 0.0>
    RM = 0.9
The level of importance of a particular broker having layers of bids and asks, and being noted in the history, to the price move
<E1, 1.0> <V1, 0.75> <1, 0.5> <S1, 0.25> <N1, 0.0>
    RM = 0.05
The level of importance of the company having been queried in the last few months about the top 20 shareholders because of an increase in the volume of trading AND this volume attributed to changes in the top 20 shareholders, to the price move
<E1, 1.0> <V1, 0.75> <1, 0.5> <S1, 0.25> <N1, 0.0>
    RM = 0.5
The level of importance of enquiries by the ASX to the company about an announcement (including periodic reports), the price move
<E1, 1.0> <V1, 0.75> <1, 0.5> <S1, 0.25> <N1, 0.0>
    RM = 0.05
The level of importance of a particular broker being responsible for most of today's volume, to the price move
<E1, 1.0> <V1, 0.75> <1, 0.5> <S1, 0.25> <N1, 0.0>
    RM = 0.50

Validation Rules confirm if SSN (timing, level of importance)
    in context -
    RM = 1.0

Alternate Hypotheses confirm if alert previously classified as SSN ((timing, level of importance)
    in context -
    RM = 1.0

TABLE 1-continued

FRAME: Substantial Shareholders Notice (SSN)

Default Specialisation

The level of importance of an SSN being lodged recently to the price move
<E1, 1.0>
    RM = 1.0

The fuzzy modelling approach described above is used to model the meta knowledge and knowledge. On a heuristic level, which is hierarchically organised, the knowledge representation takes the form of frames which contain structural knowledge slots, prototypical knowledge slots and control knowledge slots. The higher heuristic levels are course classification hypotheses whereas the lower levels are more specific. These higher and lower levels are connected by a specialisation relationship connecting the frames that represent general classification hypotheses to frames representing more specific hypotheses. These concepts are illustrated in Table 1 showing an SSN frame which includes both prototypical knowledge and control knowledge parts.

The causal level knowledge representation is represented by five types of nodes.

1. Hypothesis nodes, which correspond to the SNCE hypotheses under consideration, are connected to the frames that represent the same hypotheses at the heuristic level. The frame given in Table 1 for example, would be connected to the hypothesis nodes associated with a situation where a Substantial Shareholders Notice (SSN) is being considered as a possible cause of the alert "Today's Price versus Previous Close".
2. State nodes, which correspond to the states of the system process, such as the inference process, that determines the state of the hypothesis being considered.
3. Action nodes, which determine the transformation from one state to another, such as the transformation of a linguistic variable to form an atomic corrected evidence value, based on the RMs associated with the instantiated frames.
4. Initial causes nodes, which represent the possible original causes of the instantiation of the diagnostic hypotheses under consideration. In this example, the hypothesis relates to the occurrence of the alert "Today's price versus Previous Close".
5. Findings nodes, which represent the observable conditions or data in the system. This takes the form of the results of the action nodes.

The causal reasoning is manifest as a form of causal nets. When an hypothesis node is instantiated via an initial cause, the system places the associated hypotheses on the agenda (representing states), and the corresponding frames are activated. The heuristic and causal levels represent the surface and deep knowledge respectively. Once the initial cause hypothesis is confirmed the states are instantiated. This instantiation then confirms the presence or absence of the state's manifestation. If such a manifestation is found, the causal path which has been considered to instantiate the state is confirmed; if not, other paths are considered. As a consequence of the frames, which are associated with the hypothesis nodes, the LV (observed data) are transformed into findings using the action nodes that are on the confirmed causal path. The findings are also used as threshold levels, which may be used to confirm or alter the causal path.

As the knowledge representation is constructed using classes and objects in an hierarchical organisation, the observable conditions as well as the frames at the heuristic level may be shared between the heuristic and causal levels.

The review process for assumption based truth maintenance essentially involves the communication of the $CMAD_{cm}A$'s belief structure, supporting both the intermediate and final propositions of a SNCE, from the $CMAD_{cm}A$ at node $10_i$ to each node $10_{i+k}$ in the hierarchy. The communication is facilitated using a communication protocol and the blackboard 12. The protocol is governed by a set of rules contained in the blackboard 12 which also records the SNCE generated by a pry monitoring system. The SNCE generated by the primary monitoring system includes the variance and other basic SNCE details. Based on the ith agents deliberations, this SNCE is classified and the classification is supported by evidence. The ith agents classification and supporting evidence is then passed, via the blackboard 12, to the ith+1 agent as part of the review process.

A specific application of the conceptual model of the $CMAD_{cm}$ multi-agent decision support system of FIG. 1 will now be described for supporting the ASX surveillance $CMAD_{cm}$ analyst team review process. For the sake of brevity, this $CMAD_{cm}$ multi-agent decision support system will be referred to as ALCOD. ALCOD assists the ASX's surveillance analysts decision making task of classifying a SNCE generated by the primary monitoring system (SOMA). The role of the surveillance division in the ASX is to monitor the market to ensure trading is well informed. A fully informed trading environment is one where all participants have access to the same information about the products being traded. Clearly in a complex market, where individual traders have different incentives and are in different positions to gather information, a fully informed trading environment is an impossible ideal. As a result, the division may detect unusual patterns of market behaviour that might instance market manipulation, insider trading and similar practices. Unusual patterns might be reflected in heavy turnover in a particular stock, or in a price change much larger than changes in other stock prices observed that day. Once an unusual pattern is detected, if no adequate explanation is found and there appears to have been a breach of the ASX rules, it is reported to the Exchange's companies division (if a listed company is involved), the ASX membership division (if a broker is involved), or the ASX derivatives division (if a derivative security is involved). Where there appears to have been a breach of the law, the matter is reported to the federal government body that administers the corporations law, namely the Australian Securities Commission (ASC) for further investigation and, if necessary, for legal action.

The SOMA model monitors trading on the ASX's electronic, order-driven system, the Stock Exchange Automated Trading System (SEATS). There are up to 100,000 SEATS entries on a typical day. SOMA includes priorities that are determined by the type of alert generated. For example, when there is a volume type alert (e.g., when an extraordinary large volume is traded), the number of days since the stock was previously traded is a factor that contributes to the choice of the alert's priority.

Surveillance operations can be broken down into a sequence of steps, as follows.

1. Once the automated system detects unusual market activity, it produces an alert. The type of alert depends on the nature of the unusual activity. Typical alert reports include, for example: Sale Price versus Close Price on any of the last n Days, Sale Price versus Previous Close, Volume of n Days versus Past n Day Volume, and Today's Volume over n % of Issued Capital. These alert reports, while identifying possible non-compliance, are in fact only indicators of actual or potential market manipulation techniques.

2. SOMA separates the alerts into those that relate to one of the top 200 liquid stocks and the rest (about another 900 stocks), which are classified as illiquid stocks. A different analyst is responsible for each category. Liquid stocks are, by their nature, well researched by market participants. They make up the most significant part of the market index and can be seen as representing "the market". Alerts generated by liquid stocks are sent to the one market analyst for scrutiny. Alerts for the illiquid stocks, which make up the bulk of the alerts, are sent to an assistant market analyst who is supervised by a market analyst. To optimise the number of rejected alerts, the compliance parameters are constantly reviewed and adjusted (see FIG. 3).

3. At the start of analysis, the assistant market analyst is presented with a graphic user interface (GUI), displaying the current alerts generated by the primary system, keyed by ASX code.

4. When the assistant market analyst selects a stock code for which there is an alert, she is presented with the report that details why the alert was generated.

5. The assistant market analyst then adds comments to the GUI, using as a guide a set of questions that are documented in her manual. The answers to these questions determine whether the alert is to be rejected (because it can be legitimately explained, for instance by the announcement of a takeover bid for the company) or accepted for further scrutiny. They relate, for example, to issues of price or volume movements compared to previous movements of that stock and to the movement in the relevant share market index, or the issuance of company announcements, brokers' newsletters, etc. Reference is made to charts of the past trading patterns of the stock and the index, the stock's alert history, news services, and other information that may be of interest Comments are added to the alert (via the GUI) on anything that the assistant market analyst believes may help the market analyst in reviewing the alert.

6. The assistant market analyst compares the stock's price and volume movements with its history and with movements in the relevant index, in addition to the comparisons already made by the automated system.

7. The assistant market analyst (when possible) inputs alert codes. These codes flag the alert status as judged by the assistant. They may indicate, for example, that the alert is "not for analysis", "watch" or "tin line with sector".

8. If, at this stage of the review, an alert (or more likely, a series of alerts) appears to have identified a significant change in the market for a stock that is unexplained by news and other market information, then the assistant market analyst refers the circumstances to ASX Companies Division personnel. They contact the relevant company should they deem it necessary, and decide whether an official query to the company is warranted.

9. The next step in surveillance is conducted by the market analyst, who receives the case details from the assistant market analyst (via the now updated GUI). The market analyst has access to a database containing points of interest relating to news items, brokers' recommendations, public newsletters and journal recommendations, on-line charts, the response from the ASX Companies Division personnel or the ASX Membership Division (if applicable), and alert history files. Occasionally the entered alert code will be altered by the market analyst.

10. Any unexplained pattern of trading is then brought to the senior market analyst's attention for further inquiry. After conducting a detailed analysis (including, for example, an analysis of who bought and who sold, and an evaluation of the value of the stock traded relative to the stock's capitalisation) a report is prepared by the senior market analyst for the surveillance manager, who then determines if a detailed investigation is justified. If so the report is forwarded to a surveillance investigator, who enquires into the matter.

The ALCOD's primary function is to suggest an appropriate alert code, and to present the evidence supporting this suggested code. A secondary function of the ALCOD system is to assist in the management of the classification review process conducted by the team of surveillance analysts and the generation of an audit trail of the decisions made by the team. This trail is used to fine-tune the ALCOD system, and potentially can be used to review the threshold levels in the SOMA system. The architecture of the ALCOD system is illustrated in FIG. 2. Each $CMAD_{cm}$ evaluating agent is presented with a LOOK GUI, which presents the alert details and enables the invocation of ALCOD. ALCOD then supports the analysts in their classification task by presenting the Boolean cues appropriate to the alert type (SNCE) in question, and the LV associated with the Boolean cues. From a comparison of FIGS. 1 and 2 it will be evident that ALCOD employs a multi-agent architecture similar to the conceptual model of FIG. 1, which includes the analysts 20, expert systems 22, a blackboard 24, a GUI 26 for each analyst, and databases 28 containing additional related information. ALCOD is centred around a relational database which contains: (1) the output from SOMA, the current SNCE details under scrutiny, (2) reference databases including brokers research information, the stock master list, the SNCEs history in the form of previous exceptions, including SNCEs details and subsequent classification supported by evidence, and (3) control rules, including the coordination knowledge. The expert systems 22 appropriate for each level of expertise in the team hierarchy contain the knowledge of the lower level expert systems plus (if required) the knowledge specific to that level. This design allows for the complete review of the agent's assumptions, in the form of LVs, and their decisions based on the accumulated evidence. The blackboard 24 contains control rules and meta rules controlling part of the heuristic level knowledge, for example, the rules governing which hypotheses to consider given the alert type presented. The LVs, each agents results and the accumulated evidence may also be on the blackboard 24, depending on the status of the diagnostic process.

Once an alert code plus supporting evidence have been assigned to an alerted stock, the information is passed to the next team member for review. This communication is conducted via the blackboard 24, keyed on the ASX stock code. The blackboard is typically a dynamic reference database. Modifications to an agent's results can be performed either by manually editing this evidence or by using hedging strategies, such as altering the assumptions and the linguistic variables. The results of each team member's analysis are added to the decision audit trail.

Figure 4:
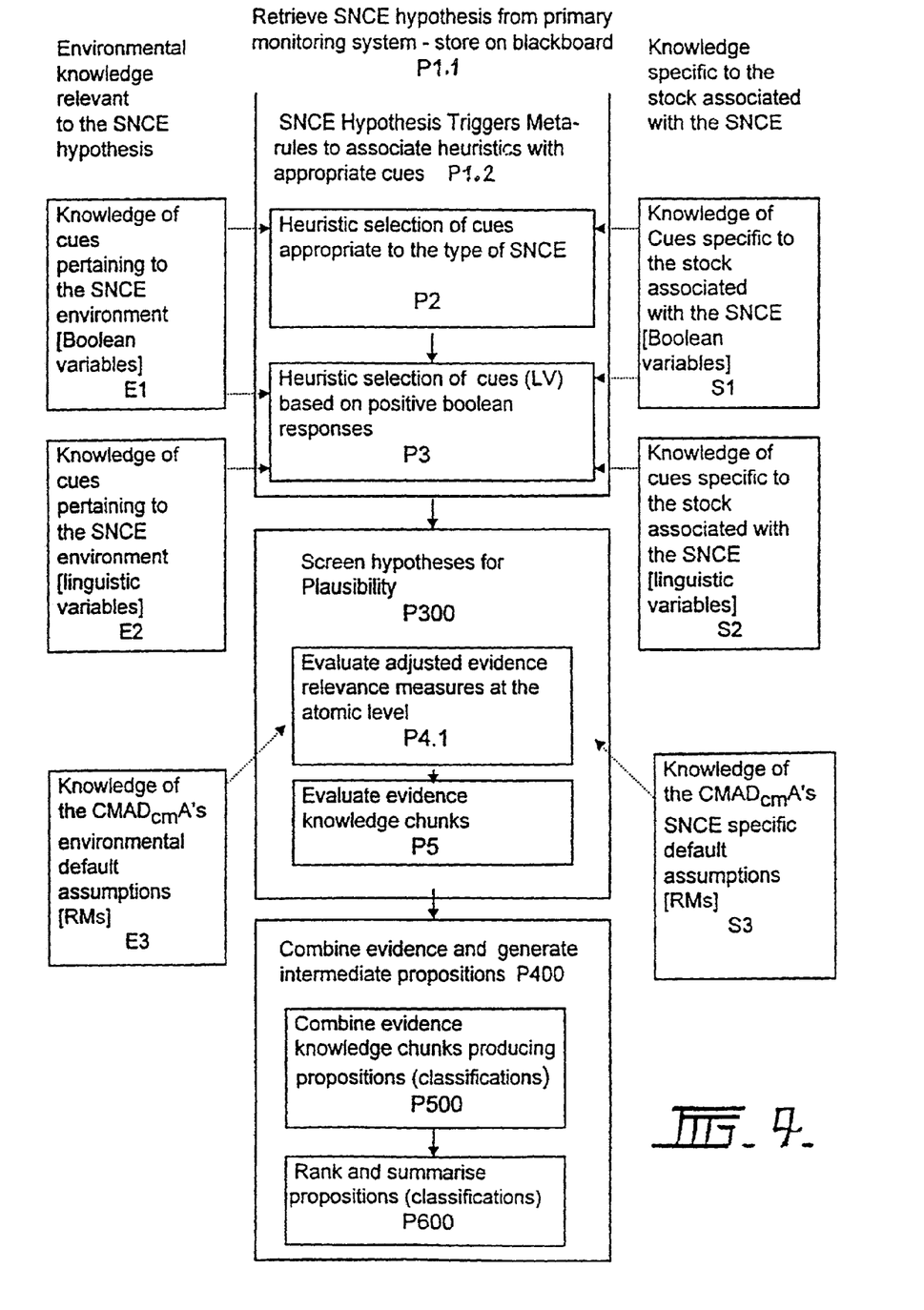
FIG. 4 illustrates a preferred method of implementing both procedural and declarative knowledge used by the model of FIG. 1.

To support the individual compliance agent, ALCOD takes the form of a diagnostic problem-solving decision support system comprising an expert system or comparative knowledge and search processing system, a database, and a graphic user interface (GUI). Its function is to present cues, via the GUI 26, appropriate to the type of SNCE alert presented. These cues use the $CMAD_{cm}$ syntax and semantics and provide decision assistance to the evaluating agents with their analysis. The cues comprise relevant pieces of information, which may partially or fully support the proposition of noncompliance, or may partially or fully repudiate it. It also assists in the combination of pieces of information. FIG. 4 illustrates an ALCOD alert GUI and controls available to the agent to retrieve the SNCE hypothesis or variance alert.

The ASX surveillance division uses 24 different classifications (intermediate propositions) of an alert, each requiring supporting evidence. For example, classifications appropriate to the two alert types "Sale Price versus Previous Close" and "Sale Price versus Previous Price" are: Media Article (M), Company Announcement (N), Substantial Shareholding Notice (SSN), Error (E), In line with Underlying Security (W1), Watch (Q), Watch and Ring Companies Department (R), Analysis Commenced (A), Investigation Commenced (C) and Not for Analysis, for various reasons, such as insufficient volume (F), insufficient price (G), in line with industry classification (J), or in line with market index (I).

Surveillance team members use internal and external information, as well as historical cases that include an alert code and its supporting evidence. Consequently, the analysts are typically faced with large amounts of temporal and context sensitive information, both directly and indirectly related to the event under scrutiny. This may lead to inconsistencies in the analysts' decision making and evidence production. Additionally, analysts may manifest bias in the form of recurring inconsistencies over time or inconsistencies between the analysts in the team.

The goal of ALCOD is to assist the decision maker to match events generated by an external agent to known, or suspected, patterns of anomalous agent behaviour. This goal can be seen as the terminal hypothesis (proposition) supported by subgoals or node hypotheses (propositions). An objective of ALCOD is to minimise the inconsistencies mentioned above and to impose a formal framework for combining complementary and conflicting evidential information. This framework also assists the analyst to manage the high volume of related external information.

The two related alert types, "Sale Price versus Previous" and "Sale Price versus Previous Price" mentioned above, were chosen as a representative example of the type of SNCE which occurs. The decision processes were then analysed and broken down into a set of true-false Boolean cues. Table 2 below represents the cues for these two alert types.

TABLE 2

| Cue | | |
|---|---|---|
| *Media and Cancellations* | | |
| Q13M | Is the price move explained by a recent media article? | T/F |
| Q15 | Was the alert generated because a trade was cancelled? | T/F |
| *Low Volumes* | | |
| Q14F | Did todays price movement occur on volumes relatively low for this stock? | T/F |
| *Buying and Selling Pressure: Bids Compared to Asks* | | |
| QA | Is a particular broker responsible for all or most of today's price move? | T/F |

TABLE 2-continued

| Cue | | |
|---|---|---|
| Q1A | Has a particular broker got layers of bids/asks? | T/F |
| *Comparison with Relevant Indices* | | |
| Q2 | Over the same period is the price in line with the relevant index? | T/F |
| Q3 | Over the same period is the move in line with an underlying security? | T/F |
| *Announcements* | | |
| Q4 | Is the price move explained by a recent company announcement? | T/F |
| Q5 | Has ASX queried the company in the last few months about a price move? | T/F |
| Q8 | Has ASX queried the company in the last few months about an increase in the volume of shares traded (i.e. have they asked any of the top 20 shareholders)? | T/F |
| Q10 | Did any of the top 20 shareholder's changes explain the recent volume? | T/F |
| Q12 | Has ASX queried the company in the last few months about an announcement (including periodic reports)? | T/F |
| QSSN | Has a substantial shareholders notice been lodged recently? | T/F |

These cues are used to confirm the presence or absence of the facts and empirical evidence that guide the surveillance analysts in the task of alert classification. The relevance measures for the two alert codes are obtained during an earlier knowledge acquisition phase, and encoded as part of the declarative knowledge frames. These relevance measures are mapped to the cues given in Table 2 above.

During the knowledge acquisition phase a number of methods were used to acquire the domain knowledge for ALCOD. A description of the ASX's surveillance operation at a macro level was employed to give a world view of the goals, objectives and tools currently used for $CMAD_{cm}$ at the ASX. Various training manuals and surveillance documentation were then reviewed in order to obtain a better understanding of the ASX's procedures. For the next stage it was necessary to conduct interviews with the $CMAD_{cm}$ agents. Three domain experts participated in the knowledge acquisition interviews: a senior analyst, an analyst and an assistant analyst. The interviews were employed to obtain an initial understanding of the problem domain and obtain specific domain knowledge for the construction of an expert system. This was achieved by asking the domain expert specific questions to explain how they make their decisions. Relevance measures were obtained in a similar manner. For example, the following question was asked and answered: "If a substantial shareholders notice is present, i.e., True, what relevance does this have on the assigning of a particular alert code?". The relevance measures so attained for each alert code are given in Table 3 below, and form part of the declarative knowledge frames.

TABLE 3

Relevance Measures for Alert Codes Appropriate to the SNCE Alert Types: "Sale Price versus Previous Close" and "Sale Price versus Previous Price"

| | Alert Classifications | | | | | | | | |
|---|---|---|---|---|---|---|---|---|---|
| Cues | E | SSN | W1 | M | F | N | J | Q | R |
| QSSN | 0.00 | 0.90 | 0.00 | 0.00 | 0.00 | 0.00 | 0.00 | 0.00 | 0.00 |
| Q15 | 1.00 | 0.00 | 0.00 | 0.00 | 0.00 | 0.00 | 0.00 | 0.00 | 0.00 |
| QA | 0.00 | 0.05 | 0.10 | 0.05 | 0.40 | 0.05 | 0.05 | 0.40 | 0.20 |
| Q1A | 0.00 | 0.00 | 0.05 | 0.05 | 0.20 | 0.05 | 0.05 | 0.40 | 0.20 |

TABLE 3-continued

Relevance Measures for Alert Codes Appropriate to the SNCE Alert Types: "Sale Price versus Previous Close" and "Sale Price versus Previous Price"

| Cues | Alert Classifications | | | | | | | | |
|------|---|---|---|---|---|---|---|---|---|
|      | E | SSN | WI | M | F | N | J | Q | R |
| Q2   | 0.00 | 0.00 | 1.00 | 0.05 | 0.05 | 0.05 | 1.00 | 0.30 | 0.50 |
| Q3   | 0.00 | 0.00 | 1.00 | 0.05 | 0.05 | 0.05 | 0.05 | 0.30 | 0.50 |
| Q4   | 0.00 | 0.00 | 0.05 | 0.05 | 0.05 | 1.00 | 0.05 | 0.30 | 0.50 |
| Q5   | 0.00 | 0.00 | 0.10 | 0.05 | 0.05 | 0.05 | 0.05 | 0.30 | 0.50 |
| Q8   | 0.00 | 0.50 | 0.05 | 0.05 | 0.10 | 0.05 | 0.05 | 0.20 | 0.50 |
| Q10  | 0.00 | 0.05 | 0.05 | 0.10 | 0.05 | 0.10 | 0.05 | 0.10 | 0.50 |
| Q12  | 0.00 | 0.50 | 0.05 | 0.05 | 0.05 | 0.05 | 0.05 | 0.10 | 0.40 |
| Q13M | 0.00 | 0.00 | 0.00 | 1.00 | 0.00 | 0.00 | 0.00 | 0.00 | 0.00 |
| Q14F | 0.00 | 0.00 | 0.00 | 0.00 | 1.00 | 0.00 | 0.00 | 0.00 | 0.00 |

From Table 3 we can see, for example, that based on the cue Q12 the relevance measure for the classification R is 0.40 (which indicates that this stock is to be watched for future possible indications of non compliance and that the ASX's Companies Division is to be notified of a possible breach). In other words, Q12 has a 0.40 relevance measure for assigning an R classification.

Figure 3:
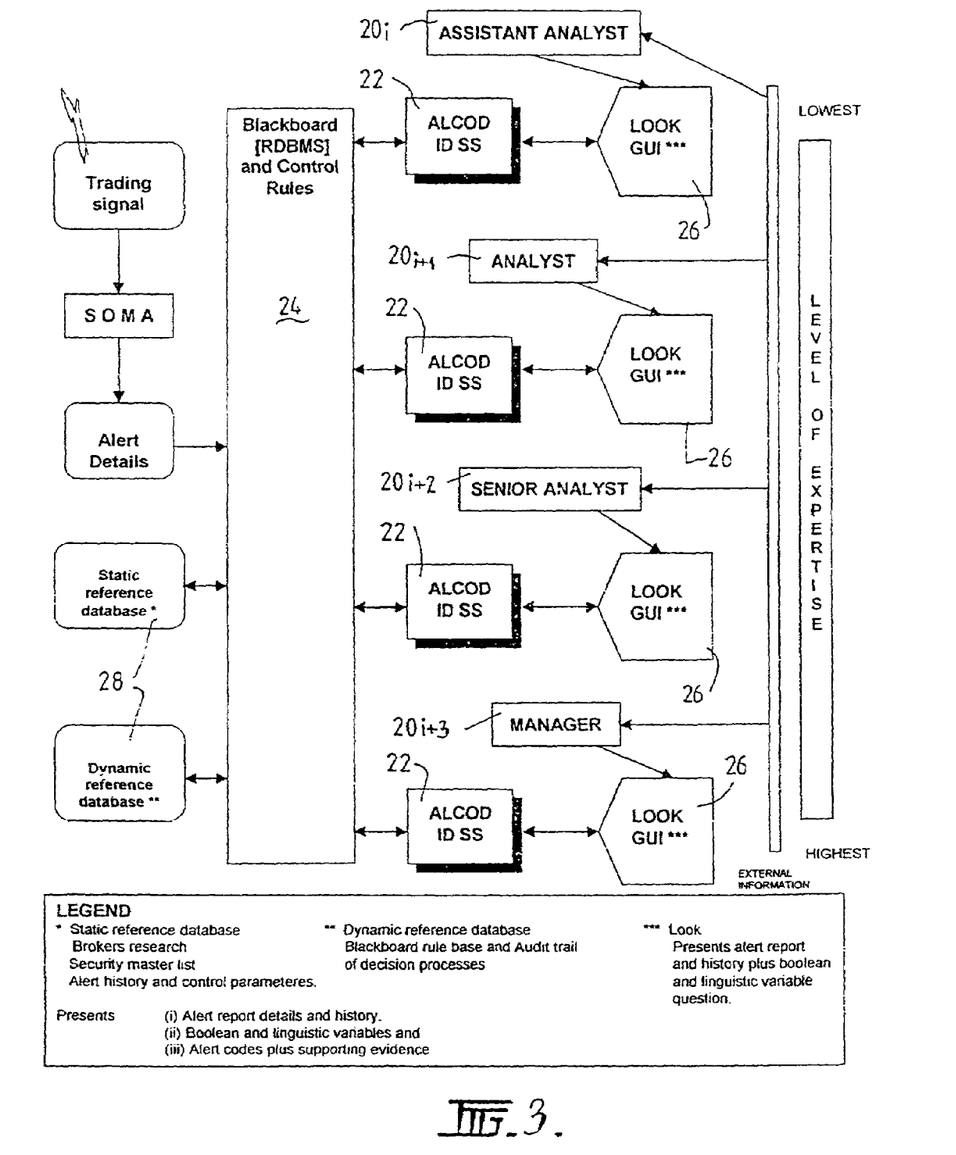
FIG. 3 illustrates the architecture of typical system for applying $CMAD_{cm}$ multi-agent decision support in the Surveillance Division of the ASX.

The $CMAD_{cm}$ agent's primary goal is to evaluate all possible information that can repudiate the hypothesis of non-compliance. ALCOD assists the agents by operationalising his goal. It does this by developing a set of appropriate environmental and stock specific propositions. They are derived from the premise set associated with the SNCE case under review, the agents default assumptions (the RMs), the agents environmental and stock specific assumptions (the LV associated with a positive response to the premise set cues). FIG. 3 illustrates the procedural and declarative knowledge used by ALCOD, the processes used to apply this knowledge and the order in which the processes are applied. In ALCOD the procedural knowledge is represented as procedural schemata, and the declarative knowledge as template schemata. Operationally, the declarative schemata, ie. the templates, are structured in object-attribute-value triplets. The notion of a class template is used, which specifies the common features of a collection of objects. A class is a set of objects, which possess the common features specified by the class template. Objects, which are members of a class, are created by instantiating a class template.

Figure 5:
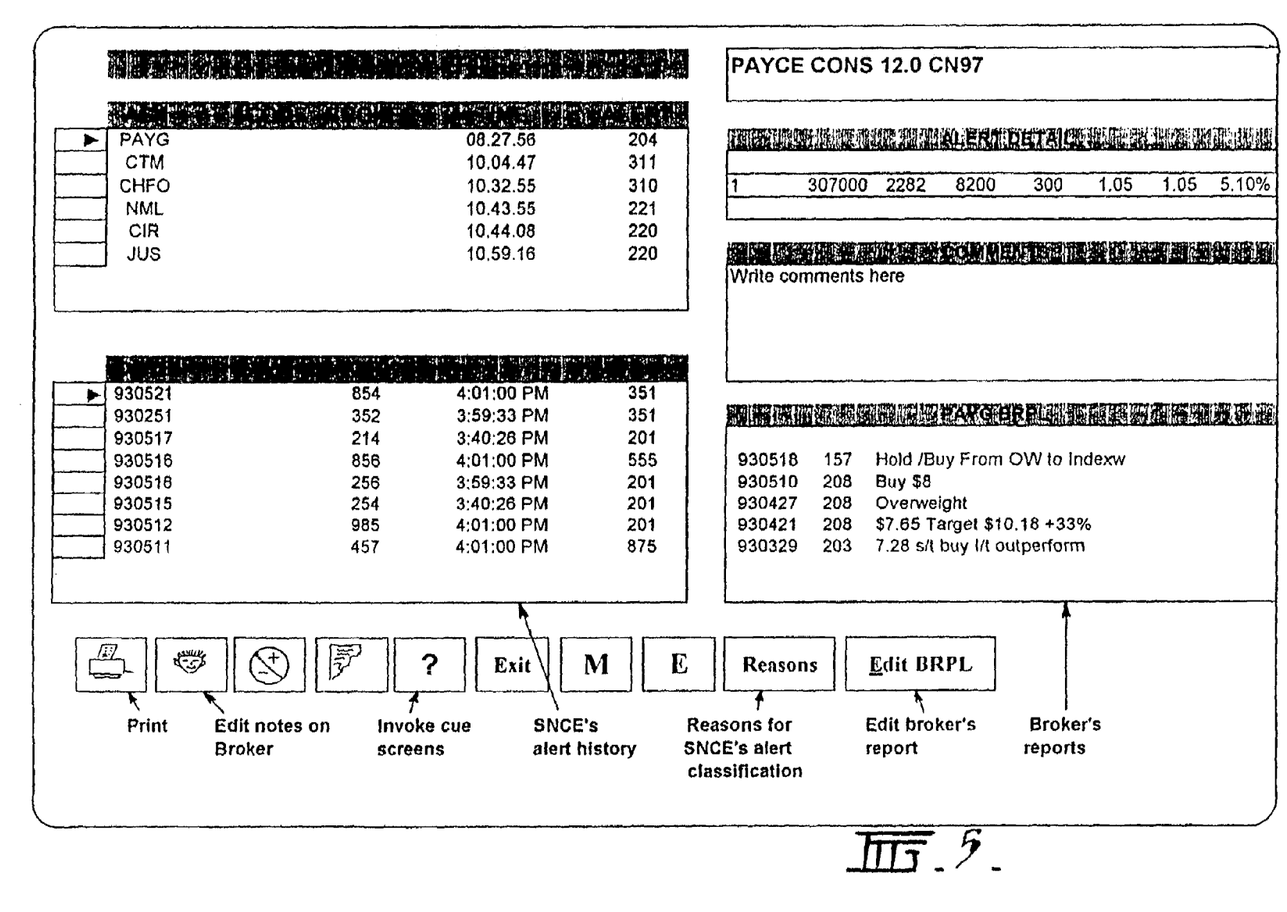
FIG. 5 illustrates an alert graphic user interface (GUI) employed by a compliance agent in the system of FIG. 3; and, FIG. 6 illustrates a GUI for obtaining responses from the compliance agent to heuristic cues in the system of FIG. 3.
Figure 6:
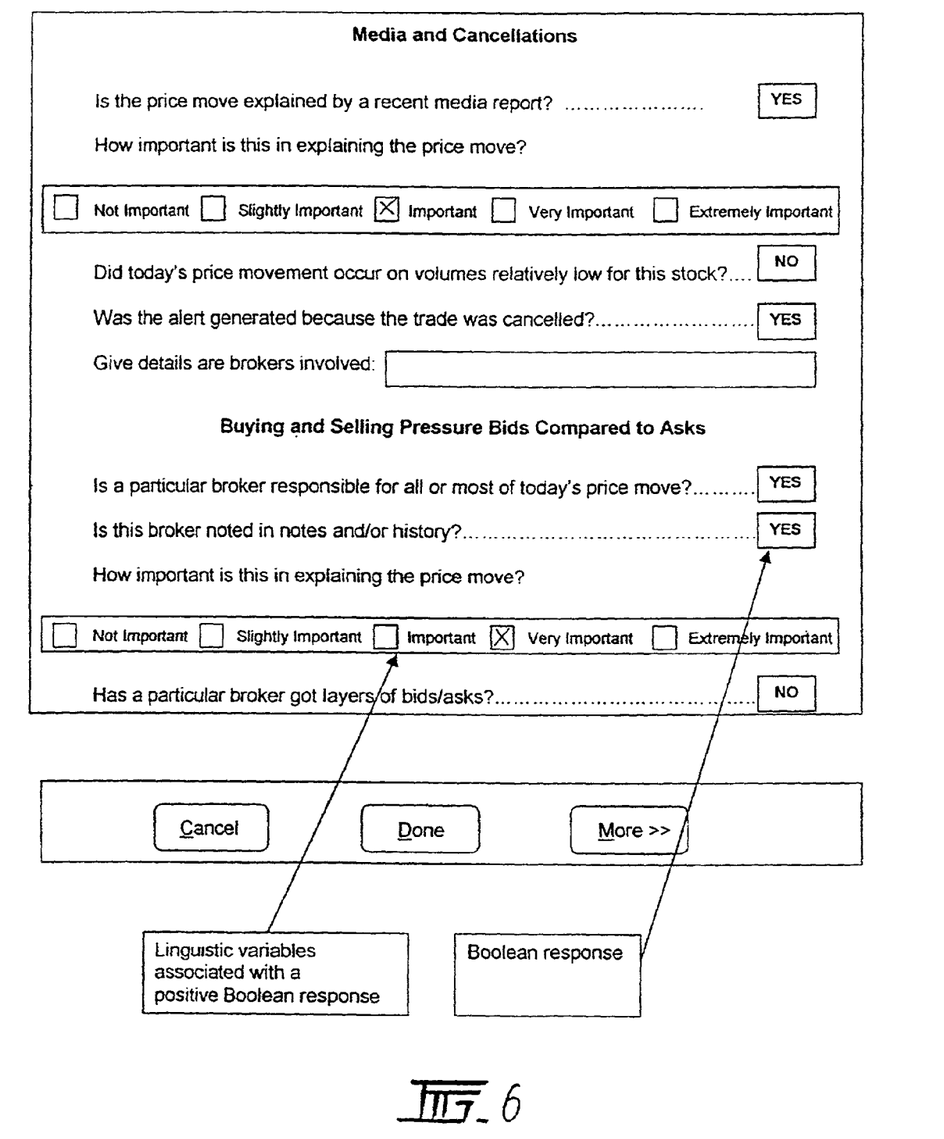

The first step P1.1 involves retrieval of the SNCE hypothesis, the variance alert, from the is primary monitoring system, and storing it on the blackboard. The alert record contains details of the alert type, the SNCE transaction, details of the entity under review (the stock)—current and historical, and other related information. Control rules on the blackboard retrieve this hypothesis from the output of SOMA. Once the SNCE hypothesis is placed on the blackboard, it triggers meta knowledge and rules to associate heuristics with appropriate cues. It also triggers the heuristic solution of cues appropriate to the SNCE type by drawing on the knowledge of cues pertaining to the SNCE environment E1, and knowledge of cues specific to the stock associated with the SNCE, S1. Based on the SNCE type, the blackboard meta-rules then select the Boolean cues appropriate to this SNCE type, as given in Table 2. FIG. 5 illustrates a GuI for obtaining responses from the compliance agent to heuristic cues. The Boolean responses relate to the required judgments of, for example, buying and selling pressure, comparisons with relevant indices, company announcements, and media announcements and cancellations of trades. At step P3, the heuristic selection linguistic variable (LV) cues associated with the positive Boolean responses obtained at step P2 are heuristically selected. The selection is based on both the knowledge of LV cues pertaining to the SNCE environment, E2, as well as knowledge of LV cues specific to the stock associated with the SNCE, S2. At P4, the hypotheses are screened for plausibility by using the positive Boolean responses and associated linguistic variables.

More specifically, at P4.1 the adjusted relevant measures at the atomic level are evaluated to determine whether they fulfil a partial test of sufficient conditions. Both local rules and meta-rules are triggered, and procedures, rules and linguistic variable cues are placed on the agenda and processed. The resulting linguistic variable metrics adjust the RMs to produce the adjusted evidence at the atomic level. Both knowledge of procedures, rules and cues associated with the $CMAD_{cm}$ analyst's and SNCE and its environmental default assumptions, E3, and the knowledge of procedures, rules and cues associated with the SNCE, its attributed and associated entities, S3, are employed in this step of evaluating the adjusted evidence relevance measures. Then at P5, evaluation of the evidence knowledge chunks occurs to determine whether or not they partially fulfil a test of secondary conditions. The knowledge source is similar to that for P4.1. At step P6 and P6.1, the combined evidence knowledge chunks and the results of applying exclusion and confirmation rules are evaluated, resulting in the intermediate propositions. The intermediate propositions include both SNCE classification plus supporting evidence.

Finally, the intermediate propositions are ranked at P7, and the results of the compliance agents analysis are summarised and posted on the blackboard to facilitate review by other team members.

Now that a preferred embodiment of the method and system for supporting compliance monitoring for anomaly detection (CMAD) have been described in detail, it will be apparent that the described system and method provide a number of significant advantages over prior art CMAD systems, including the following:

(i) it can add value to compliance operations by reducing the cost of compliance monitoring, assisting in compliance accountability and providing transparency, when required, thereby contributing to corporate governance and due diligence;

(ii) it can employ a method that adds value to a generated exception by encapsulating and associating the event's attributes, its source agent's characteristics, the evaluating agent's analysis and the recommended remedial action plus the substantiating evidence;

(iii) it can exploit an infrastructure support construct and secondary filter, allowing for collaboration, truth maintenance, audit trails and decision support, thereby facilitating decision consistency and greater processing volume;

(iv) it can use the approach as a decision aid and secondary filter, analysis of results can then be used to review the analyst's decision-making processes and to refine the primary filter tolerance levels;

(v) it can support a structured, flexible and inclusive approach to compliance analysis;

(vi) it can add a cost function to the compliance-monitoring infrastructure to capture cost-benefit trade-offs;

(vii) it enables insight to be gained from the knowledge acquisition component when setting up paramaters and heuristics;

(viii) it can assist large enterprises to set up an effective accountability structure across the organisation;

(ix) it can add value to information retrieval and transfer software such as OLAP, by monitoring and controlling the selection of information based on organisational criteria;
(x) it can reinforce corporate probity;
(xi) it can reduce distrust of compliance monitoring systems, by reinforcing accountability and transparency;
(xii) it can significantly improve the accuracy of the results generated by conventional compliance systems;
(xiii) it can increase reliability, consistency, productivity and effectiveness of compliance operations;
(xiv) it can free up resources so they can be redirected to more productive activities with greater pay-offs;
(xv) it can improve overall risk management; and,
(xvi) in the context of the capital market, it can build confidence and therefore increase market liquidity and ultimately decrease the cost of capital to business.

It will also be evident to persons skilled in the relevant arts that numerous variations and modifications may be made to the described CMAD system and method, in addition to those already described, without departing from the basic inventive concepts. For is example, although the application of fuzzy sets is a preferred feature of the method and system, in appropriate cases crisp sets can be applied. All such variations and modifications are to be considered within the scope of the present invention, the nature of which is to be determined from the foregoing description and appended claims.

What is claimed is:

1. A method of supporting a compliance agent in compliance monitoring for anomaly detection (CMAD), the method including the steps of:
   receiving information relating to a suspected non-compliant event (SNCE) generated by a primary monitoring system;
   selecting first heuristic cues corresponding to a set of premises from a knowledge base, said set of premises being grouped together as of possible relevance to the SNCE;
   obtaining a response from the agent to each of the first heuristic cues in a Boolean response form;
   selecting second heuristic cues from said knowledge base based on said Boolean responses;
   obtaining responses from the agent to each of the second heuristic cues in a linguistic variable form;
   combining said linguistic variables with respective relevance measures for each of said second heuristic cues to produce respective weighted intermediate propositions, said intermediate propositions providing supporting evidence; and
   combining said weighted intermediate propositions to produce final propositions repudiating or confirming the SNCE, which together with said supporting evidence enables the agent to make a decision regarding the SNCE more efficiently.

2. A method of supporting a compliance agent in CMAD as defined in claim 1, wherein said responses to each of the second heuristic cues are in the form of fuzzy linguistic variables.

3. A method of supporting a compliance agent in CMAD as defined in claim 2, wherein said linguistic variables reflect the degree of importance of an assumption and range from extremely important to not important.

4. A method of supporting a compliance agent in CMAD as defined in claim 3, wherein said linguistic variables include extremely important, very important, important, slightly important, and not important.

5. A method of supporting a compliance agent in CMAD as defined in claim 1, wherein said knowledge base comprises rules and facts reflecting a level of domain knowledge appropriate to the compliance agent; a premise set, consisting of facts and empirical information reflected by the responses to Boolean cues appropriate to the type of SNCE under consideration; default assumptions in the form of said relevance measures; and, the compliance agents own assumptions.

6. A method of supporting a compliance agent in CMAD as defined in claim 5, wherein said relevance measures (RMs) are elicited from a compliance agent as part of the initial knowledge acquisition during construction of the knowledge base, and wherein an RM of 1 indicates maximum relevance and an RM of 0 indicates minimum relevance.

7. A method of supporting a compliance agent in CMAD as defined in claim 5, wherein the method is capable of supporting multiple compliance agents, said multiple agents together forming a team in which the agents are organised sequentially and hierarchically, with each successive agent having greater domain knowledge and experience.

8. A method of supporting a compliance agent in CMAD as defined in claim 7, the method further comprising providing each compliance agent with access to a common central database via a graphic user interface (GUI) for human agents, or an appropriate communication protocol for machine based agents.

9. A method of supporting a compliance agent in CMAD as defined in claim 1, wherein on a heuristic level, which is hierarchically organised, knowledge representation takes the form of frames which contain structural knowledge slots, prototypical knowledge slots and control knowledge slots.

10. A method of supporting a compliance agent in CMAD as defined in claim 9, wherein each slot in the frame has the following form:

$$\langle \text{linguistic\_value } V_{ij}, \text{ possibility\_value } i_{ij} \rangle$$

and is associated in each slot with an assumption i, wherein if assumption i takes the (linguistic) value $V_{ij}$ it is compatible with a hypothesis H (an intermediate proposition) with possibility $i_{ij}$.

11. A method of supporting a compliance agent in CMAD as defined in claim 8, wherein on a causal level knowledge representation is represented by five types of nodes:
   (i) Hypothesis nodes, which correspond to the SNCE hypotheses under consideration, and are connected to the frames that represent the same hypotheses at the heuristic level;
   (ii) State nodes which correspond to the states of the system process, such as an inference process, that determines the state of the hypothesis being considered;
   (iii) Action nodes, which determine the transformation from one state to another, such as the transformation of a linguistic variable to form an atomic corrected evidence value, based on the RMs associated with instantiated frames;
   (iv) Initial causes nodes, which represent possible original causes of the instantiation of the diagnostic hypotheses under consideration; and
   (v) Findings nodes, which represent the observable conditions or data in the system and reflect the results of the action nodes.

12. A method of supporting a compliance agent in CMAD as defined in claim 11, wherein the causal reasoning is manifest as a form of casual nets formed according to the following steps:

when an hypothesis node is instantiated via an initial cause, associated hypotheses are placed on the agenda (representing states) and corresponding frames are activated;

once the initial cause hypotheses is confirmed the states are instantiated which confirms the presence or absence of the states manifestation;

if such a manifestation is found the causal path which has been considered to instantiate the state is confirmed, if not, other paths are considered; and as a consequence of the frames, which are associated with the hypothesis nodes, the linguistic variables (observed data) are transformed into findings using the action nodes that are on the confirmed causal path.

13. A method of supporting a compliance agent in CMAD as defined in claim 12, wherein the findings are also used as threshold levels, which may be used to confirm or alter the causal path.

14. A method of supporting a compliance agent in CMAD as defined in claim 13, wherein as the knowledge representation is constructed using classes and objects in an hierarchical organisation, the observable conditions as well as the frames at the heuristic level are shared between the heuristic and causal levels.

15. A system for supporting a compliance agent in compliance monitoring for anomaly detection, the system comprising:

a relational database for receiving and storing information relating to a suspected non-compliant event (SNCE) generated by a primary monitoring system;

a knowledge and search processing system accessible to the compliance agent for receiving and storing information relating to a suspected non-compliant event (SNCE) generated by a primary monitoring system, and for selecting first heuristic cues corresponding to a set of premises from a knowledge base, said set of premises being grouped together as of possible relevance to the SNCE; and a graphic user interface (GUI) for human agents, or appropriate communication protocol for machine based agents, to enable the agent to respond to each of the first heuristic cues using Boolean responses; wherein said knowledge and search processing system is also adapted to select second heuristic cues from said knowledge base based on said Boolean responses, and said GUI for human agents, or appropriate communication protocol for machine based agents, is adapted to enable the agent to respond to each of the second heuristic cues using linguistic variables, wherein said knowledge and search processing system is adapted to combine said fuzzy linguistic variables with respective relevance measures for each of said second heuristic cues to produce respective weighted intermediate propositions, said intermediate propositions providing supporting evidence, and to combine said weighted intermediate propositions to produce final propositions repudiating or confirming the SNCE, which together with said supporting evidence enables the agent to make a decision regarding the SNCE more efficiently.

16. A system for supporting a compliance agent in CMAD as defined in claim 15, further comprising a central repository in the form of a dynamic reference database to facilitate communication and review of the compliance agents' decision making process, in a multi-agent CMAD decision support system.

17. A system for supporting a compliance agent in CMAD as defined in claim 16, wherein said communication and review process is for the purpose of assumption based truth maintenance and involves communication of the compliance agent's belief structure, supporting both the intermediate and final propositions of a SNCE, from a compliance agent at node $N_i$ to each node $N_{j \& k}$ in a team hierarchy.

18. A system for supporting a compliance agent in CMAD as defined in claim 17, wherein each compliance agent has access to a knowledge and search processing system appropriate to the agent's level of expertise in the team hierarchy, each knowledge and search processing system containing the knowledge of the lower level expert systems plus (if required) the knowledge specific to that level.

* * * * *